United States Patent
Chen et al.

(10) Patent No.: US 8,855,255 A0
(45) Date of Patent: Oct. 7, 2014

(54) SYSTEMS AND METHODS FOR OPTIMIZING TIMING PHASE IN MODEM DEVICES

(75) Inventors: Qing Chen, Fremont, CA (US); Qian Cheng, Dekalb, IL (US)

(73) Assignee: U.S. Robotics Corp., Schaumburg, IL (US)

( * ) Notice: Subject to any disclaimer, the term of this patent is extended or adjusted under 35 U.S.C. 154(b) by 3772 days.

(21) Appl. No.: 10/113,230

(22) Filed: Mar. 29, 2002

(65) Prior Publication Data

US 2003/0185324 A1 Oct. 2, 2003

(51) Int. Cl.
*H04L 7/00* (2006.01)

(52) U.S. Cl.
USPC ............ 375/355; 375/229; 375/373; 342/442

(58) Field of Classification Search
USPC ......... 375/355, 229, 373, 442, 230, 232, 233, 375/222
See application file for complete search history.

(56) References Cited

U.S. PATENT DOCUMENTS

| | | | | |
|---|---|---|---|---|
| 5,675,612 A | * | 10/1997 | Solve et al. | 375/326 |
| 5,835,295 A | * | 11/1998 | Behrens | 360/51 |
| 6,603,829 B1 | * | 8/2003 | Glaser et al. | 375/360 |

* cited by examiner

*Primary Examiner* — Stephen Chin
*Assistant Examiner* — Nasrin Hoque
(74) *Attorney, Agent, or Firm* — Mayer, Brown, Rowe & Maw

(57) ABSTRACT

Systems and methods are provided for performing the required phase calculation in a telecommunications system in order to optimize system performance more quickly and with reduced complexity as compared to prior approaches to solving this problem. In accordance with the preferred exemplary embodiment of the present invention, the phase delay of the precursor equalizer (EQ) is calculated off-line and as a result it is not necessary to fill the precursor EQ delay line with the indicated number of symbols as in the previous approach. Additionally, because the precursor EQ is fractionally spaced, both sine and cosine values of the 4kHz tone's initial phase can be achieved simultaneously. As a result, only 36 quick timing sequence (QTS) symbols are needed in order to perform the required estimation.

1 Claim, 1 Drawing Sheet

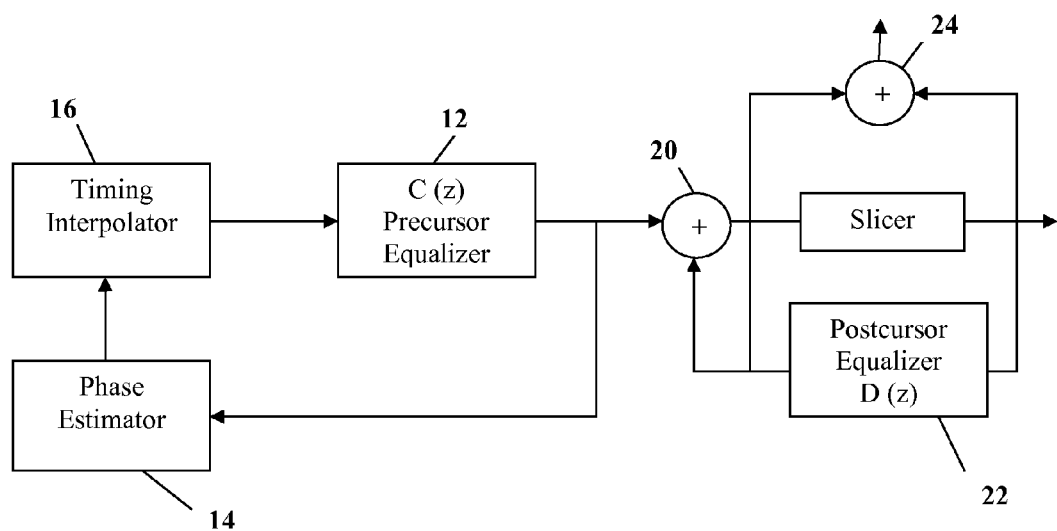

SYSTEMS AND METHODS FOR OPTIMIZING TIMING PHASE IN MODEM DEVICES

BACKGROUND OF THE INVENTION

1. Field of the Invention

The present invention relates generally to the field of telecommunications devices. More specifically, the present invention is directed to systems and methods for optimizing timing phase in telecommunications equipment.

2. Description of the Related Art

Currently, in the field of analog modem devices, and particularly with respect to the V.92 quick connect phase I, a digital modem transmits quick timing sequence (QTS) signals at the rate of 8000 symbols per second to the analog modem. The QTS signals consist of 128 repetitions of the sequence {+V, +0, +V, −V, −0, −V} where V is defined to be the pulse code modulation (PCM) code word whose Ucode is $U_{QTS}$ and 0 is the PCM code word with Ucode 0[1]. After analog-to-digital conversion of the voice band modem signal and demodulation, the receiver can get a 4 kHz tone. The challenge in this arrangement is to utilize the 4 kHz tone and the converged decision feedback equalizer (DFE) coefficients to lock the timing phase to the optimal point relative to the symbol interval. The desired result is to adjust the timing interpolator to sample the equalized signal at the maximum eye opening instant. It is recognized that this can be achieved at the phase of $(2i+1)\pi/2$, where $i \in \{integer\}$ of the 4 kHz tone.

The prior approach to solving this problem was to utilize the precursor equalizer (EQ) output to get accurate timing phase estimation. In order to obtain a valid precursor EQ output for estimation purposes, it was necessary to wait until the precursor EQ delay line is filled with sufficient QTS samples. In order to make the appropriate calculations, it is necessary to fill twice as long as the delay line in order to calculate both sine and cosine of the initial phase respectively. As a result, there is a time cost of 168 QTS symbols in order to make the appropriate phase estimation with this approach.

Although it is possible to achieve the desired result through this solution, the system must be relatively complex and will incur the indicated time delay associated with the stated calculation. In systems of this nature, there is always a need to improve performance by achieving a desired result more quickly or through a less complex calculation. The inventors of the instant application have achieved such a solution which improves performance by achieving the desired result in less time and through utilizing a less complex system and calculation.

SUMMARY OF THE INVENTION

The present invention is directed to systems and methods for performing the required phase calculation in order to optimize system performance more quickly and with reduced complexity as compared to prior approaches to solving this problem. In accordance with the preferred exemplary embodiment of the present invention, the phase delay of the precursor EQ is calculated off-line and as a result it is not necessary to fill the precursor EQ delay line with the indicated number of symbols as in the previous approach. Additionally, because the precursor EQ is fractionally spaced, both sine and cosine values of the 4 kHz tone's initial phase can be achieved simultaneously. As a result, only 36 QTS symbols are needed in order to perform the required estimation. The system is also inherently less complex.

In accordance with an exemplary embodiment of the present invention, it has been recognized that for a 4 kHz tone with an 8 K sampling rate, there are only two decision levels with equal amplitude and opposite signs so that the input and output of the DFE have the following relationship:

$$\sum_{i=0}^{n_1} a_i \cdot \sin(\alpha - i \cdot \pi/2) + \sum_{j=0}^{n_2} (-1)^{j+1} \cdot b_j \cdot r \cdot \sin(\alpha + \beta) = r \cdot \sin(\alpha + \beta)$$

Where
 r, Equalizer amplitude gain at 4 kHz;
 $\alpha$, Initial phase before DFE;
 $\beta$, Equalizer phase compensation;
 $a_i$, Converged precursor fractionally spaced EQ coefficients saved from normal connection;
 $b_j$, Converged postcursor EQ coefficients saved from normal connection In order to calculate the precursor EQ phase delay of the 4 kHz tone, let $\alpha=0$ which results in the following:

$$(-a_1+a_3-a_5+a_7\ldots)+r\cdot\sin(\beta)\cdot(-b_0+b_1-b_2+b_3\ldots)=r\cdot\sin(\beta)$$

When $\alpha=\pi/2$ the following relationship exists:

$$(a_0-a_2+a_4-a_6\ldots)+r\cdot\sin(\beta)\cdot(-b_0+b_1-b_2+b_3\ldots)=r\cdot\cos(\beta)$$

As a result, $$\tan(\beta) = \frac{-a_1 + a_3 - a_5 + a_7\ldots}{a_0 - a_2 + a_4 - a_6\ldots}$$

Those skilled in the art will recognize that for the 4 kHz tone signal with an 8 K symbol rate, the samples in the fractionally spaced precursor EQ delay line is filled as follows:

$$\sin(\alpha), \cos(\alpha)-\sin(\alpha), -\cos(\alpha), \sin(\alpha), \cos(\alpha)$$

Accordingly, $\tan(\alpha)$ can be easily calculated by adjusting the timing phase $\delta$ such that:

$$\alpha+\beta+\delta=\pi/2$$

And $$\delta=\tan^{-1}((\tan(\alpha)+\tan(\beta))/(\tan(\alpha)\cdot\tan(\beta)))$$

Through utilizing this approach fewer QTS symbols are required in order to estimate the optimal timing phase. As a result, fine training of the timing phase is possible through utilization of the remaining symbols. Furthermore the computation complexity is also reduced.

BRIEF DESCRIPTION OF THE DRAWINGS

FIG. 1 illustrates a first exemplary embodiment of the invention.

DETAILED DESCRIPTION OF THE PRESENTLY PREFERRED EMBODIMENTS

FIG. 1 illustrates a first preferred exemplary embodiment of the present invention which is shown generally at 10. In accordance with preferred exemplary embodiment, calculations are performed in order to optimize the timing phase in a communications systems. It will recognized by those skilled in the art that a digital signal processor will be utilized in the preferred embodiments for performing the indicated calculations, however, it should be recognized that other conventional techniques may also be utilized in order to perform the required calculations.

FIG. 1 is essentially a block diagram illustration of the various relevant calculations that are made by the system. In a first block 12, converged precursor EQ coefficients are generated and provided for phase estimation in block 14. The output from the phase estimation step or block 14 is thereafter provided to the timing interpolator 16. The timing interpolator provides an output to the input of the precursor equalizer 18. The precursor equalizer 18 has an output that feeds an adder 20. An output from the postcursor equalizer 22 also feeds the adder 20. The adder 20 has an output that feeds a further summing device 24 that provides the DFE output.

In accordance with the preferred exemplary embodiment of the present invention, the phase delay of the precursor EQ is calculated off-line and as a result it is not necessary to fill the precursor EQ delay line with the indicated number of symbols as in the previous approach. Additionally, because the precursor EQ is fractionally spaced, both sine and cosine values of the 4 kHz tone's initial phase can be achieved simultaneously. As a result, only 36 QTS symbols are needed in order to perform the required estimation. The system is also inherently less complex.

As noted above, it has been recognized that for a 4 Hz tone with an 8K sampling rate, there are only two decision levels with equal amplitude and opposite signs so that the input and output of the DFE have the following relationship:

$$\sum_{i=0}^{n_1} a_i \cdot \sin(\alpha - i \cdot \pi/2) + \sum_{j=0}^{n_2} (-1)^{j+1} \cdot b_j \cdot r \cdot \sin(\alpha + \beta) = r \cdot \sin(\alpha + \beta)$$

Where
- r, Equalizer amplitude gain at 4 kHz;
- α, Initial phase before DFE;
- β, Equalizer phase compensation;
- $a_i$, Converged precursor fractionally spaced EQ coefficients saved from normal connection;
- $b_j$, Converged postcursor EQ coefficients saved from normal connection In order to calculate the precursor EQ phase delay of the 4 kHz tone, let α=0 which results in the following:

$$(-a_1+a_3-a_5+a_7\ldots)+r\cdot\sin(\beta)\cdot(-b_0+b_1-b_2+b_3\ldots)=r\cdot\sin(\beta)$$

When α=π/2 the following relationship exists:

$$(a_0-a_2+a_4-a_6\ldots)+r\cdot\sin(\beta)\cdot(-b_0+b_1-b_2+b_3\ldots)=r\cdot\cos(\beta)$$

As a result, $$\tan(\beta) = \frac{-a_1 + a_3 - a_5 + a_7\ldots}{a_0 - a_2 + a_4 - a_6\ldots}$$

Those skilled in the art will recognize that for the 4 kHz tone signal with an 8 K symbol rate, the samples in the fractionally spaced precursor EQ delay line is filled as follows:

$$\sin(\alpha), \cos(\alpha)-\sin(\alpha), -\cos(\alpha), \sin(\alpha), \cos(\alpha)$$

Accordingly, tan (α) can be easily calculated by adjusting the timing phase δ such that:

α+β+δ=π/2

And

δ=tan$^{-1}$((tan(α)+tan(β))/(tan(α)·tan(β)))

Through utilizing this approach fewer QTS symbols are required in order to estimate the optimal timing phase. As a result, fine training of the timing phase is possible through utilization of the remaining symbols. Furthermore the computation complexity is also reduced.

We claim:

1. A method of determining a desired timing phase in a communications device comprising the steps of:
adjusting the timing phase δ such that:

α+β+δ=π/2;

where a α Initial phase before decision feedback equalizer;
β=Equalizer phase compensation;
and determining δ=tan$^{-1}$((tan(α)+tan(β))/(tan(α)·tan(β)))
adjusting a timing interpolator to sample the equalized signal.

* * * * *